(12) United States Patent
Masaki

(10) Patent No.: US 7,969,607 B2
(45) Date of Patent: Jun. 28, 2011

(54) PRINT CONTROL APPARATUS, PRINT CONTROL METHOD, PRINT CONTROL PROGRAM, AND MEMORY MEDIUM STORING THE PROGRAM

(75) Inventor: Kazunori Masaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1409 days.

(21) Appl. No.: 10/446,719

(22) Filed: May 29, 2003

(65) Prior Publication Data

US 2003/0227652 A1 Dec. 11, 2003

(30) Foreign Application Priority Data

Jun. 6, 2002 (JP) ................................ 2002-165507
Apr. 24, 2003 (JP) ................................ 2003-120495

(51) Int. Cl.
*G06K 15/02* (2006.01)

(52) U.S. Cl. ...... 358/1.18; 358/1.9; 358/1.13; 358/1.12; 715/235; 399/376; 399/403; 399/375; 399/133; 270/1.01; 156/226

(58) Field of Classification Search ................ 358/1.18, 358/1.1, 450, 1.13, 1.15, 1.12, 1.9; 382/282, 382/209; 399/82, 376, 405, 403, 375, 133, 399/361; 715/235, 777, 706; 493/324, 405, 493/188, 395, 451, 448, 453; 400/70, 61; 156/256, 264, 40, 202, 226, 227, 421.4, 442.1; 270/39.09, 52.13, 1.01, 8, 16, 32
See application file for complete search history.

(56) References Cited

U.S. PATENT DOCUMENTS

| 4,214,276 | A | * | 7/1980 | Pugsley et al. | 358/528 |
| 4,539,653 | A | * | 9/1985 | Bartlett et al. | 715/235 |
| 4,717,134 | A | | 1/1988 | Iida et al. | 270/39 |
| 5,222,157 | A | * | 6/1993 | Yoneda et al. | 382/306 |
| 5,237,645 | A | * | 8/1993 | Nagata et al. | 358/1.16 |
| 5,768,677 | A | * | 6/1998 | Natsume | 399/376 |
| 5,794,980 | A | | 8/1998 | Bigler | 281/2 |
| 5,905,935 | A | * | 5/1999 | Wakamatsu et al. | 399/407 |
| 6,407,820 | B1 | * | 6/2002 | Hansen et al. | 358/1.12 |
| 6,427,058 | B1 | * | 7/2002 | Akiba et al. | 399/82 |
| 6,436,024 | B1 | * | 8/2002 | Kobayashi | 493/405 |

(Continued)

FOREIGN PATENT DOCUMENTS

JP 11-208073 8/1999

(Continued)

*Primary Examiner* — David K Moore
*Assistant Examiner* — Ashish K Thomas
(74) *Attorney, Agent, or Firm* — Fitzpatrick, Cella, Harper & Scinto

(57) ABSTRACT

The invention provides a print control apparatus, a print control method, and a print control program, in which in the case of Z-folding a sheet which has been print-outputted by using an N-up function for allocating a plurality of logic pages onto one sheet, it is possible to make layout adjustment such that the logic pages printed onto the output sheet in the Z-folding state can be easily confirmed, and also provides a memory medium in which such a program has been stored. For this purpose, layout designation to designate a mode to print the plurality of logic pages onto one of print surfaces of the sheet which is outputted by a printing apparatus is made. Further, when the sheet is Z-folded, the layout of the plurality of logic pages is adjusted so that the whole area of at least one logic page is displayed onto an exposing surface of the Z-folded sheet.

8 Claims, 12 Drawing Sheets

U.S. PATENT DOCUMENTS

| | | | |
|---|---|---|---|
| 6,546,151 B1 * | 4/2003 | Araki et al. | 382/282 |
| 6,631,007 B1 * | 10/2003 | Buis et al. | 358/1.13 |
| 6,719,680 B2 * | 4/2004 | Hosoya et al. | 493/324 |
| 6,744,530 B1 * | 6/2004 | Someno et al. | 358/1.18 |
| 6,961,135 B1 * | 11/2005 | Nakagiri et al. | 358/1.1 |
| 6,964,016 B2 * | 11/2005 | Iwasaki | 715/253 |
| 7,046,385 B2 * | 5/2006 | Mori et al. | 358/1.15 |
| 7,054,016 B2 * | 5/2006 | Nagata | 358/1.13 |
| 7,177,045 B2 * | 2/2007 | Goel et al. | 358/1.18 |
| 7,184,165 B2 * | 2/2007 | Mori et al. | 358/1.15 |
| 7,359,084 B2 * | 4/2008 | Nara et al. | 358/1.18 |
| 2002/0045524 A1 * | 4/2002 | Asai et al. | 493/188 |
| 2002/0051206 A1 | 5/2002 | Masaki | |
| 2004/0039750 A1 * | 2/2004 | Anderson et al. | 707/103 R |

FOREIGN PATENT DOCUMENTS

| | | |
|---|---|---|
| JP | 11-216924 | 8/1999 |
| JP | 2000-092307 | 3/2000 |
| JP | 2000-335039 | 12/2000 |
| JP | 2002-079727 | 3/2002 |
| JP | 2002-127634 | 5/2002 |

* cited by examiner

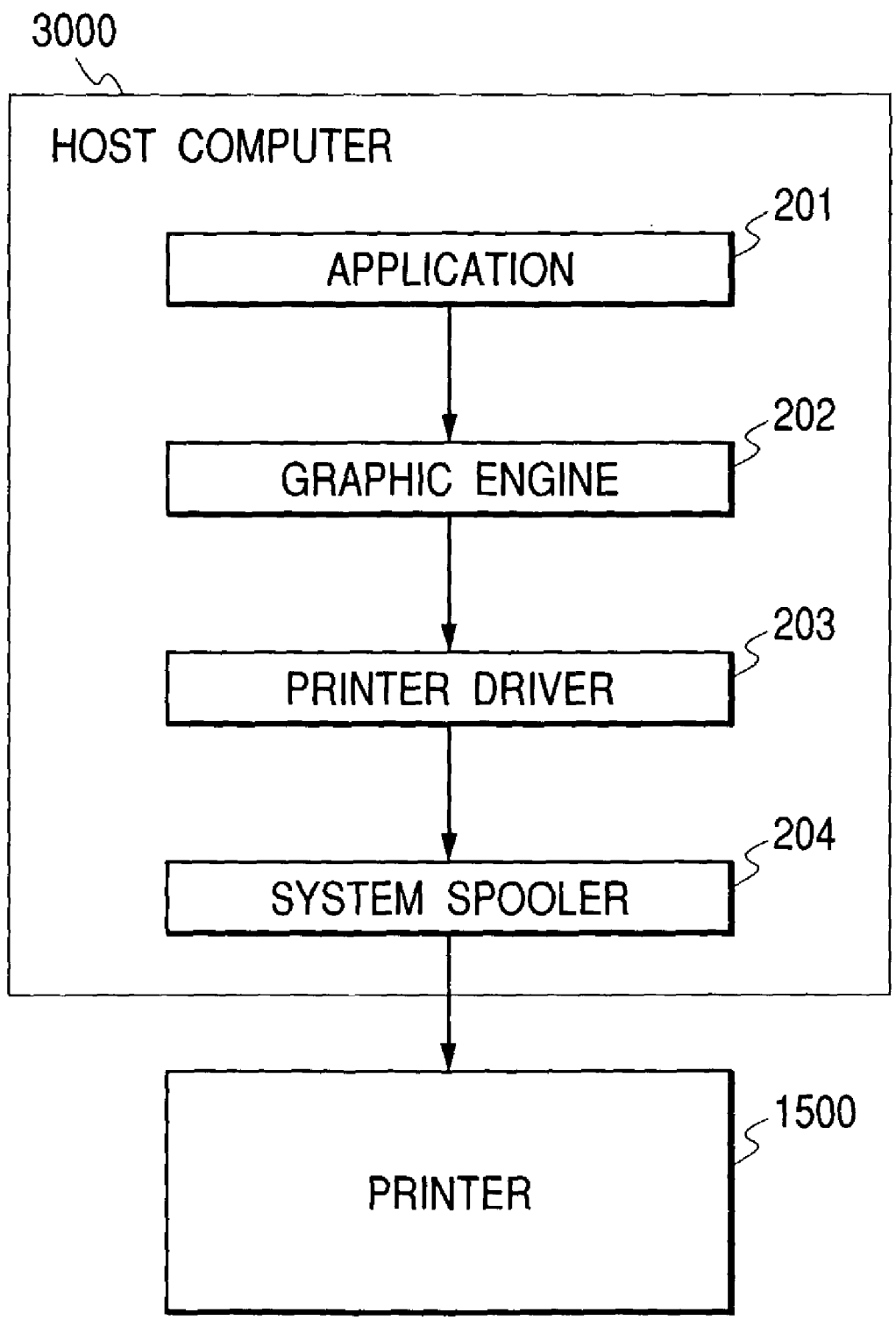

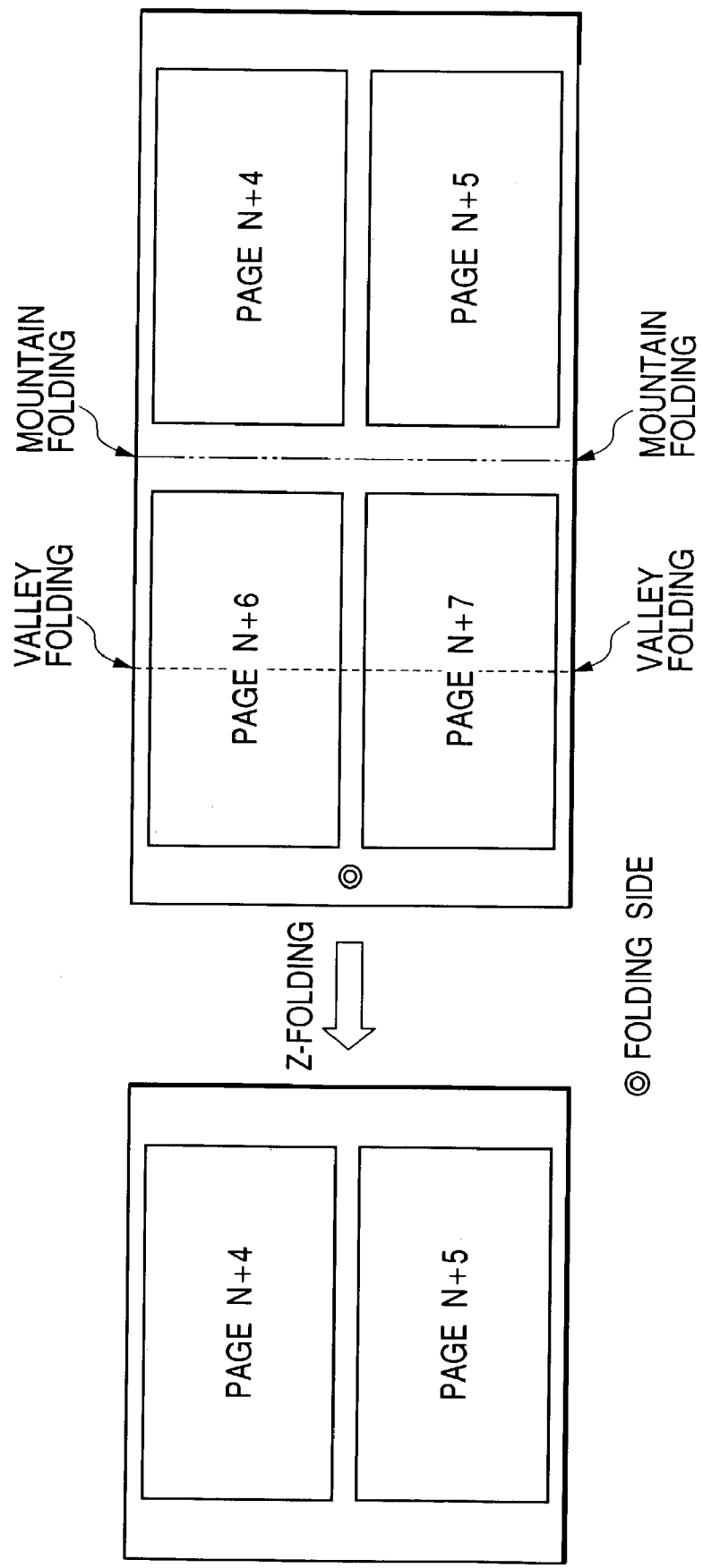

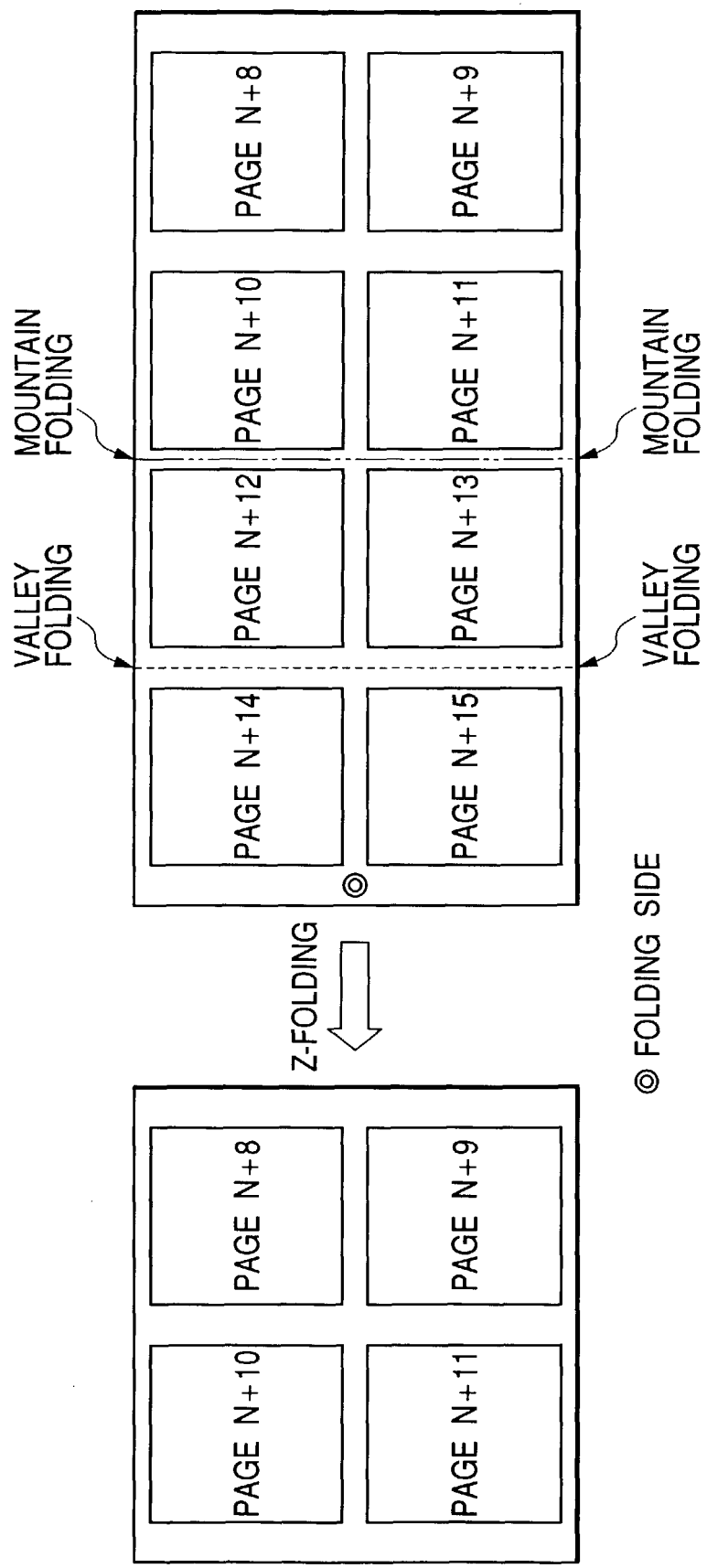

PRINT CONTROL APPARATUS, PRINT CONTROL METHOD, PRINT CONTROL PROGRAM, AND MEMORY MEDIUM STORING THE PROGRAM

BACKGROUND OF THE INVENTION

1. Field of the Invention

The invention relates to a print control apparatus, a print control method, and a print control program for forming print data to be print-outputted by a printing apparatus having a Z-folding function and to a memory medium in which such a program has been stored.

2. Related Background Art

Hitherto, in printing apparatus such as printer, copying apparatus, and the like and a finishing apparatus connected to the printing apparatus, there is an apparatus having a function for folding a printed sheet into three in a Z-character shape (hereinafter, referred to as a Z-folding) (refer to U.S. Pat. No. 4,717,134).

As a function of the print control apparatus, there is an N-up function such that a plurality of logic pages (document data or the like formed by an application program or the like) are allocated onto one output sheet. The N-up function is also referred to as 2-in-1 (a process for allocating two logic pages onto one sheet), 4-in-1 (a process for allocating four logic pages onto one sheet), or the like.

When a plurality of logic pages are allocated onto one sheet, a layout is adjusted by executing a reducing process or the like so that a plurality of logic pages are enclosed onto one sheet.

In the apparatus having such functions, in the case of executing printing by using both of the Z-folding function and the N-up function, in the N-up process, the layout adjustment of the logic pages is made by uniform control irrespective of the presence or absence of the Z-folding.

However, in the present N-up process, nothing is considered to the logic page layout in the case of Z-folding the sheet on which the logic pages have been allocated by the N-up function. There is, consequently, a case where in a state where the layout-adjusted and printed output sheet has been Z-folded, a part of information of the logic pages existing on the surface of the sheet is hidden (refer to FIG. 5 of the specification of the present invention). That is, all print contents exposed on the surface of the sheet in the folded state cannot be confirmed.

In such a case, when the user confirms the information of the logic pages on the surface, it is necessary to open and see the Z-folded pages each time, so that it is tiring. Particularly, in a POD (light printing) field such that a brochure or the like is printed and formed, document data including a photograph, drawings, or the like is often used. In such a case, if the layout process is executed, the beauty of printed matter is sometimes lost.

SUMMARY OF THE INVENTION

It is an object of the invention to provide a print control apparatus, a print control method, and a print control program in which in the case of Z-folding a print-outputted sheet by using an N-up function for allocating a plurality of logic pages onto one sheet, it is possible to make layout adjustment such that the logic pages printed onto the output sheet in the Z-folding state can be easily confirmed and to provide a memory medium in which such a program has been stored.

To accomplish the above object, there are provided a print control apparatus, a print control method, and a print control program for forming print data to be printed by a printing apparatus having a Z-folding function, wherein there are executed: layout designation in which a mode to print a plurality of logic pages onto one of print surfaces of a sheet which is outputted by the printing apparatus is designated; and layout adjustment in which upon execution of the printing using the Z-folding function of the printing apparatus, if a layout has been designated by the layout designation, the layout of the plurality of logic pages is adjusted so that a whole area of at least one logic page is displayed on an exposed surface of the sheet after it was Z-folded. A memory medium in which such a program has been stored is also provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a block diagram showing a construction for executing a printing process in a host computer 3000 in FIG. 1;

FIG. 11 is a diagram schematically showing an output example (when the 4-in-1 page layout is designated) of the Z-folding of a sheet processed by the Z-folding sheet page layout adjusting process according to another embodiment of the invention; and FIG. 12 is a diagram schematically showing an output example (when the 8-in-1 page layout is designated) of the Z-folding of a sheet processed by the Z-folding sheet page layout adjusting process according to another embodiment of the invention.

DETAILED DESCRIPTION OF THE PREFERRED EMBODIMENTS

An embodiment of the invention will be described hereinbelow with reference to the drawings.

Embodiment of the Invention

Figure 1:
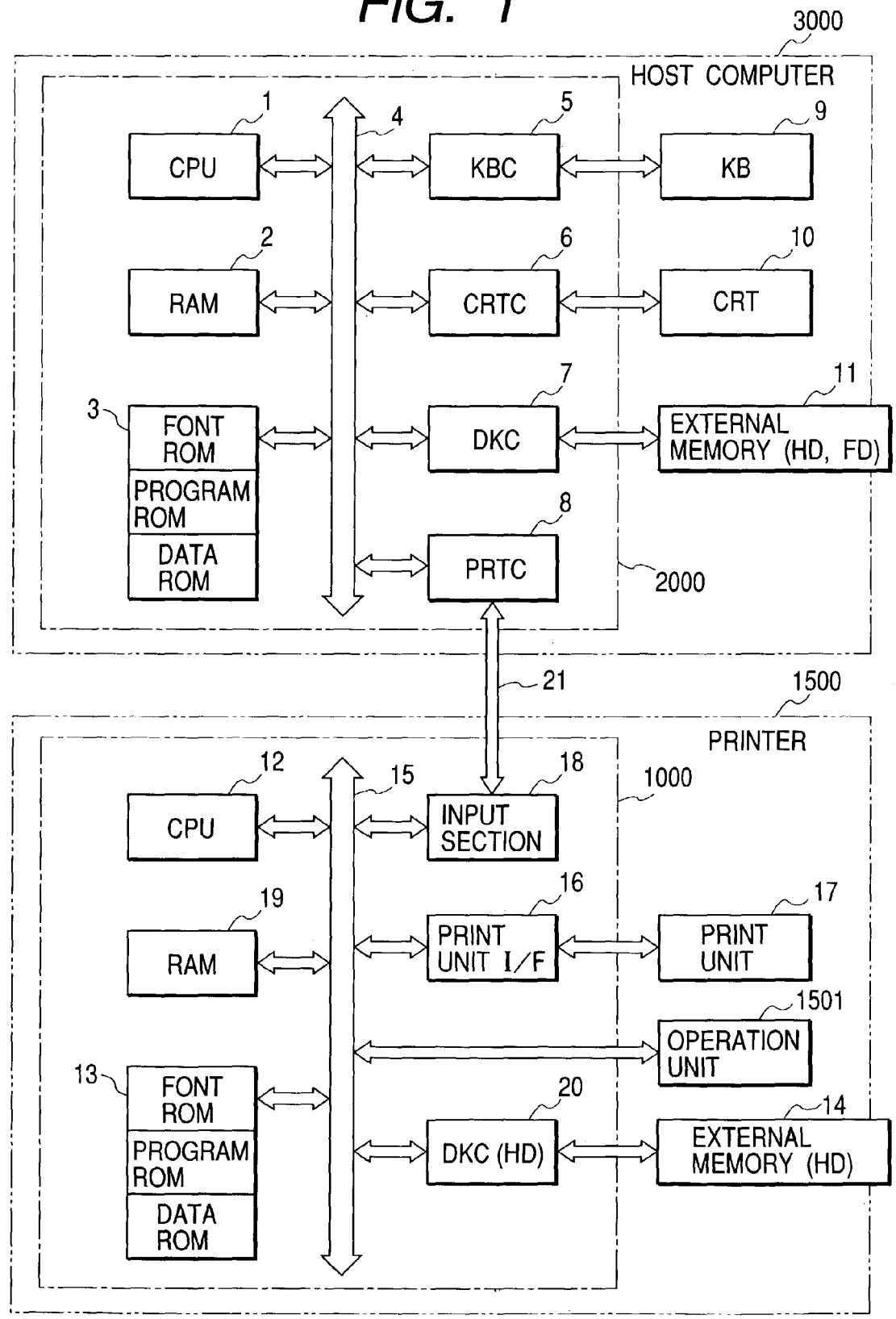
FIG. 1 is a block diagram showing a construction of a print system including a print control apparatus according to the embodiment of the invention.

FIG. 1 is a block diagram showing a construction of a print system including a printing apparatus according to the embodiment of the invention.

As shown in FIG. 1, the print system is constructed by: a host computer 3000 as a print control apparatus; and a printer 1500 as a printing apparatus connected to the host computer 3000 via a bidirectional interface 21.

Although the embodiment will be explained with respect to a case where the host computer 3000 and the printer 1500 are connected via the bidirectional interface 21, the invention is not limited to such a case but they can be also connected via the LAN, Internet, or the like. An arbitrary interface can be used as an interface which connects those apparatuses.

Although the embodiment will be explained by using the print system comprising the host computer and the printer as an example, the invention can be also applied to a print control apparatus which is provided for an apparatus having a function for printing a read-out image of an original or document data stored in a storing unit such as a hard disk or the like, for example, each of printing apparatuses such as copying apparatus, hybrid apparatus, and the like and controls those apparatuses so long as the apparatus has the N-up function and the Z-folding function or the apparatus having those functions can be added.

The host computer 3000 has a main body 2000. A CPU 1 for activating an OS (Operating System) stored in a program ROM of a ROM 3 or an external memory 11 and executing various processes on the OS is built in the main body 2000. A CPU 1 integratedly controls each device connected to a system bus 4.

For example, the CPU 1 executes a process of a document in which a figure, an image, characters, a table (including a spreadsheet), and the like exist mixedly on the basis of a document processing program stored in the program ROM of the ROM 3 or the external memory 11. The CPU 1 uses a RAM 2 as a work area at the time of executing the various processes.

A font ROM and a data ROM are provided for the ROM 3 together with the program ROM. Font data which is used for the document process or the like has been stored in the font ROM. Similar font data can be also stored in the external memory 11. Data which is used for the document process or the like has been stored in the data ROM.

As devices connected to the system bus 4, there are a keyboard controller (KBC) 5, a CRT controller (CRTC) 6, a disk controller (DKC) 7, and a printer controller (PRTC) 8.

The keyboard controller (KBC) 5 controls a key input from a keyboard (KB) 9 or a pointing device (not shown) such as a mouse or the like. The CRT controller (CRTC) 6 controls a display of a display (CRT) 10. The disk controller (DKC) 7 controls an access to the external memory 11.

The external memory 11 comprises a hard disk (HD), a floppy (registered trademark) disk (FD), or the like for storing various application programs, font data, a user file, an edit file, a printer control command forming program (hereinafter, referred to as a printer driver), and the like.

The printer controller (PRTC) 8 is connected to the printer 1500 via the bidirectional interface 21 and executes a communication control process for controlling communication with the printer 1500.

The CPU 1 executes, for example, a developing (rasterizing) process of an outline font into a display information RAM provided on the RAM 2 and enables "WYSIWYG" on the display 10. The CPU 1 opens various windows registered on the basis of a command designated by a mouse cursor (not shown) or the like on the display 10 and can set a print processing method for a printer driver including setting of a printer and selection of a print mode.

The printer 1500 has a controller 1000 for controlling the operation of the printer 1500. An input unit 18 which is connected to the host computer 3000 via the interface 21 is provided for the controller 1000. The input unit 18 fetches print information such as characters, figure, image, etc. which is outputted in a printer language format from the host computer 3000. The fetched print information is supplied to a CPU 12 via a system bus 15.

On the basis of a control program stored in a program ROM of a ROM 13 or an external memory 14, the CPU 12 develops the print information from the host computer 3000 into a work area in a RAM 19, sends image data as an image signal every page to a print unit (printer engine) 17 via the system bus 15 and a print unit I/F 16, and controls the print unit 17 so as to record the image signal onto recording paper every page.

In the embodiment, it is assumed that, in the host computer 3000, the data formed by executing a layout process such as Z-folding N-up output adjusting process or the like which will be explained hereinlater, is sent to the printer 1500. However, the invention is not limited to such an example but it is also possible to construct in a manner such that layout designation such as N-up or the like, duplex print designation, Z-folding designation, or the like is made from the host computer 3000 and a layout process of pages, operation control of a post-processing apparatus, which will be explained hereinlater, or the like is made on the printer 1500 side which received those designation settings together with the data to be printed. In such a case, the CPU 12 executes those processes or control.

A font ROM and a data ROM are provided for the ROM 13 together with the program ROM. Font data which is used when the image signal is formed has been stored in the font ROM. Data which is used on the host computer 3000 has been stored in the data ROM. This data can be also stored in the external memory 14.

The RAM 19 is used as a memory area of results of an arithmetic operation and a process, a buffering area of input data, a developing area of drawing information of an amount corresponding to both sides of the recording paper, an environment data memory area, an NVRAM, or the like. In addition to the RAM 19, a memory capacity can be expanded by an option RAM which is connected to an expanding port (not shown).

The external memory 14 comprises memory means such as a hard disk (HD) or the like. A disk controller (DKC) 20 controls an access to the external memory 14. The external memory 14 can be also constructed by another memory medium, for example, a memory card, a floppy (registered trademark) disk (FD), or the like. The number of external memories 14 is not limited to one but a plurality of other external memories in which in addition to a built-in font, an option font, a program for interpreting a printer control language of a different language system, and the like have been stored can be also connected. Further, it is also possible to provide an NVRAM and store printer mode setting information from an operation unit 1501.

An instruction to the CPU 12 is sent from the operation unit 1501. The operation unit 1501 has keys which are used for setting various modes or the like, an LED display, and the like.

A post-processing apparatus (not shown) has been attached to the printer 1500. The post-processing apparatus has the Z-folding function. Details of the Z-folding function will be described hereinlater.

Subsequently, a printing process in the host computer 3000 will be described with reference to FIG. 2. FIG. 2 is a block diagram showing a functional construction for executing the printing process in the host computer 3000 in FIG. 1.

In the host computer 3000, as shown in FIG. 2, an application program 201, a graphic engine 202, a printer driver 203, and a system spooler 204 exist as files stored in the external memory 11, respectively. Each file is loaded as a program module into the RAM 2 by an OS or a module which uses such a module and executed.

The application 201 and the printer driver 203 can be supplied later by a CD-ROM, a floppy (registered trademark) disk (FD), or the like and are stored into the external memory 11 as necessary.

When the application 201 instructs the printer 1500 to print, print data is outputted (drawn) by using the graphic engine 202 which has been loaded into the RAM 2 and can be executed. The graphic engine 202 loads the printer driver 203 prepared every printing apparatus into the RAM 2. An output of the application 201 is converted into a control command of the printer by using the printer driver 203. The converted printer control command is outputted to the printer 1500 via the interface 21 from the system spooler 204 loaded into the RAM 2 by the OS.

Figure 3B:
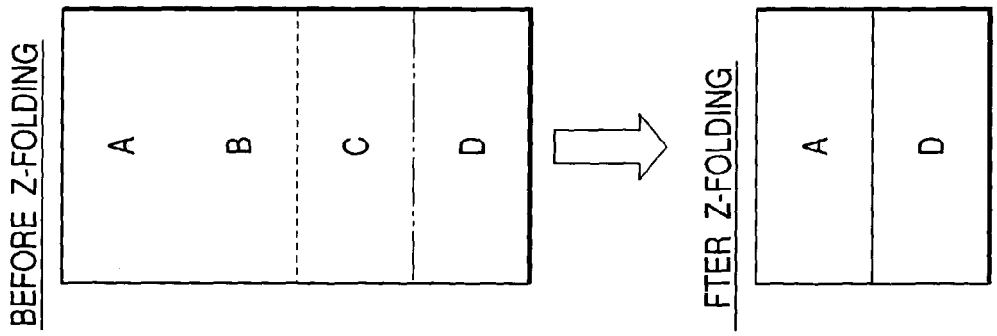
FIGS. 3A and 3B are diagrams schematically showing folding methods according to a Z-folding function of a printer 1500 in FIG. 1.
Figure 3A:
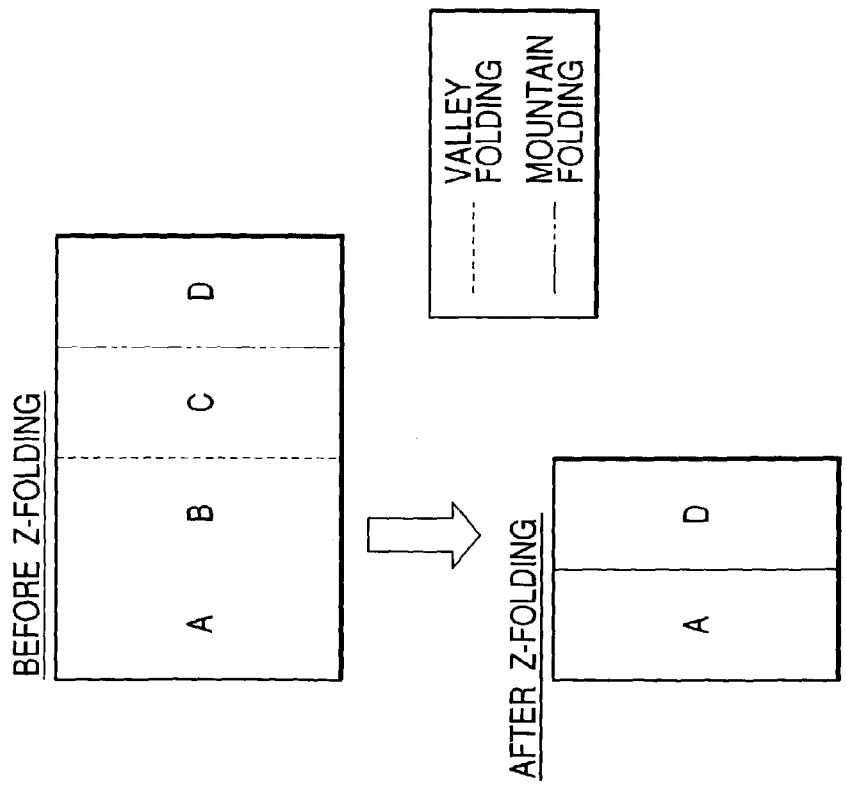

Subsequently, the Z-folding function of the printer 1500 will be described with reference to FIGS. 3A and 3B. FIGS. 3A and 3B are diagrams schematically showing folding methods of sheets using the Z-folding function of the printer 1500 in FIG. 1.

In the case of Z-folding the sheet printed in what is called a landscape mode such that the direction of the printing to the sheet is set to A→B→C→D as shown in FIG. 3A, the sheet is folded in a form as shown in FIG. 3A. In the example, the case of folding the right side toward the print surface of the sheet is shown. When the sheet size is equal to the A3 size, the sheet is folded in the A4 size.

In the case of Z-folding the sheet printed in what is called a portrait mode such that the direction of the printing to the sheet is set to A→B→C→D as shown in FIG. 3B, the sheet is folded in a form as shown in FIG. 3B. In the example, the case of folding the lower side toward the print surface of the sheet is shown. When the sheet size is equal to the size (11×17 inches), the sheet is folded in the letter size.

Although the cases where the right side and the lower side toward the print surface of the sheet are shown above, a folding position of the sheet can be also changed in accordance with the binding position. That is, in the case of folding the right side, the left side of the sheet is set to the binding position and in the case of folding the lower side, the upper side of the sheet is set to the binding position.

In the embodiment, when the print data which is transmitted to the printer 1500 is formed in the host computer 3000, the N-up output adjusting process for adjusting a layout of a plurality of logic pages allocated to a physical page is executed. At the time of executing the printing using the Z-folding function of the printer 1500, the Z-folding N-up output adjusting process for adaptively adjusting a page layout of a plurality of logic pages allocated to a Z-folding physical page corresponding to the output sheet to be Z-folded is executed. In the Z-folding N-up output adjusting process, the layout of the logic pages is also adjusted in consideration of the binding position (or the folding side of the sheet).

The Z-folding N-up output adjusting process intends to adjust the page layout of the logic pages so that a part of the logic pages allocated to the output sheet is not hidden even in a state where the output sheet is Z-folded and to adjust the page layout such that a page order of the logic pages is set to be proper even in the folded state. In other words, it is an object to execute an aligned layout process so that even if the printed sheet is Z-folded, the beauty is not lost.

Figure 4:
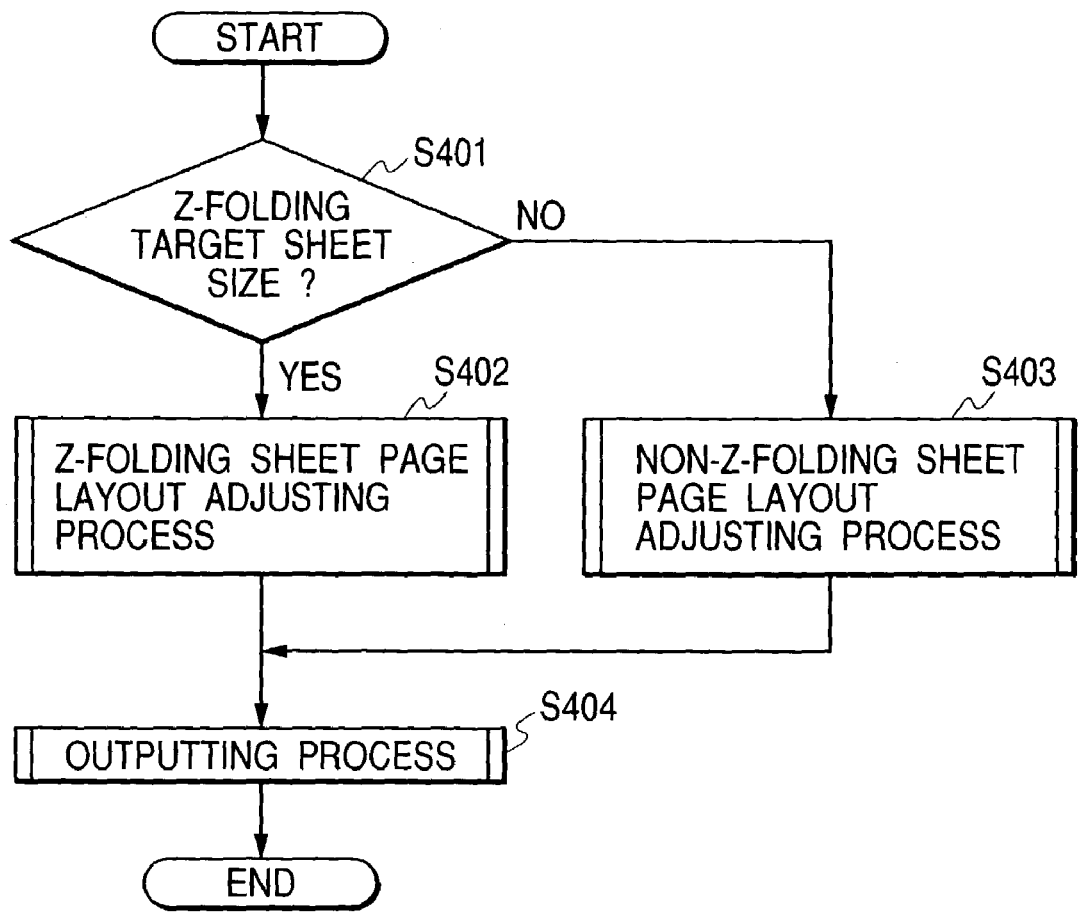
FIG. 4 is a flowchart showing a procedure for a Z-folding N-up output adjusting process by the host computer 3000 in FIG. 1.

The Z-folding N-up output adjusting process will now be described with reference to FIG. 4. FIG. 4 is a flowchart showing a procedure for the Z-folding N-up output adjusting process by the host computer 3000 in FIG. 1. In the embodiment, processes in the case where the print data is printed to one side of the sheet and the left side toward the print surface is set to the binding position will be described.

When use of the Z-folding function is designated and the Z-folding N-up output is designated, as shown in FIG. 4, first in step S401, whether the sheet size which the user wants to output is a size in which the Z-folding is possible or not is discriminated. For example, when a document in which a page of the A4 size and a page of the A3 size exist mixedly is outputted by using a printer which supports the Z-folding only to the sheet of the A3 size, the Z-folding of the page of the A4 size is impossible. On the other hand, the Z-folding of the page of the A3 size is possible. Therefore, for example, in the case of the A4 size, that is, if it is determined that the Z-folding of the sheet size in which the user wants to output is impossible, a non-Z-folding sheet page layout adjusting process is executed in step S403. Also in the case where the Z-folding is designated to a sheet such that although the Z-folding in its size is possible, the Z-folding is impossible due to ability or functional limitation of the printing apparatus, for example, an OHP sheet, thick paper, or the like, the non-Z-folding sheet page layout adjusting process is executed. Since the non-Z-folding sheet page layout adjusting process corresponds to the N-up process which is generally executed at present, its explanation is omitted here. The processing routine advances to step S404.

In the embodiment, it is assumed that if the Z-folding has been designated with respect to the Z-folding impossible sheet, the non-Z-folding sheet page layout adjusting process is executed. However, the invention is not limited to it but can use a construction such that if the Z-folding impossible sheet is designated, a warning to urge the user to change the sheet or cancel the designation of the Z-folding is generated or the like.

If it is determined in step S401 that the Z-folding is possible in the printer which is used with respect to the sheet and its size in which the user wants to output, step S402 follows and the Z-folding sheet page layout adjusting process (Z-folding N-up output adjusting process) is executed. In this instance, a layout of logic pages which are allocated to the output sheet to be Z-folded is adjusted in a manner such that information of the logic pages which are exposed on the surface is not hidden in a state where the sheet has been Z-folded. Then, step S404 follows. The layout adjusting process in step S403 will be explained hereinlater.

In step S404, page data formed in step S402 or S403 is transmitted to the printer 1500.

In the above processes, whether the sheet page layout adjusting process (Z-folding N-up output adjusting process) is executed or the non-Z-folding sheet page layout adjusting process is executed is determined in accordance with whether the output sheet size is the Z-folding possible size or not in the printer which is used. However, it is possible to cope with the sheet page layout adjusting process by a process similar to the non-Z-folding sheet page layout adjusting process in dependence on the sheet direction, the binding position, or the number of logic pages which are allocated to one physical sheet. Therefore, whether the sheet page layout adjusting process (Z-folding N-up output adjusting process) is executed or the non-Z-folding sheet page layout adjusting process is executed can be also determined in accordance with the sheet direction, the binding position, or the number of allocation logic pages per physical sheet.

Figure 5:
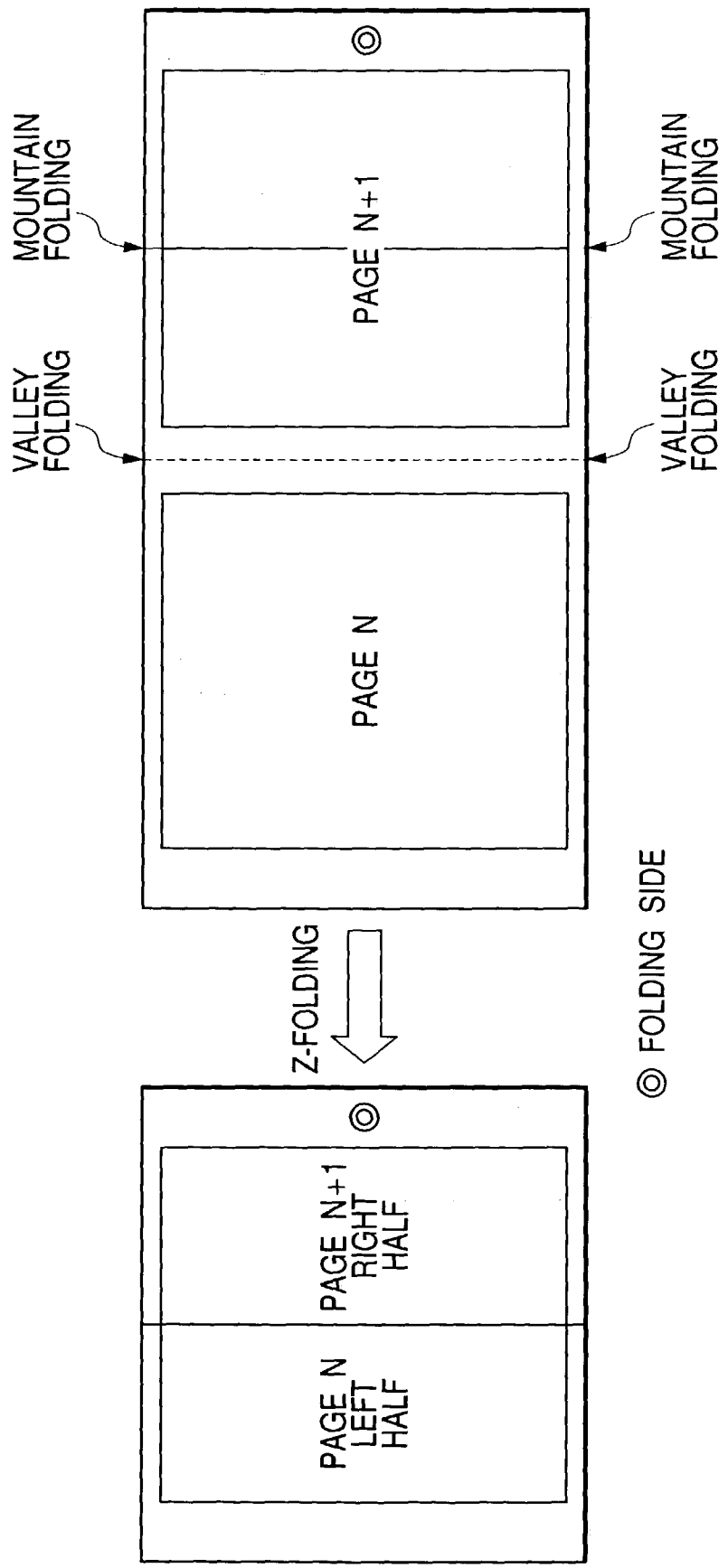
FIG. 5 is a diagram schematically showing an output example in the case where a sheet is Z-folded by a conventional page layout adjusting process.
Figure 6:
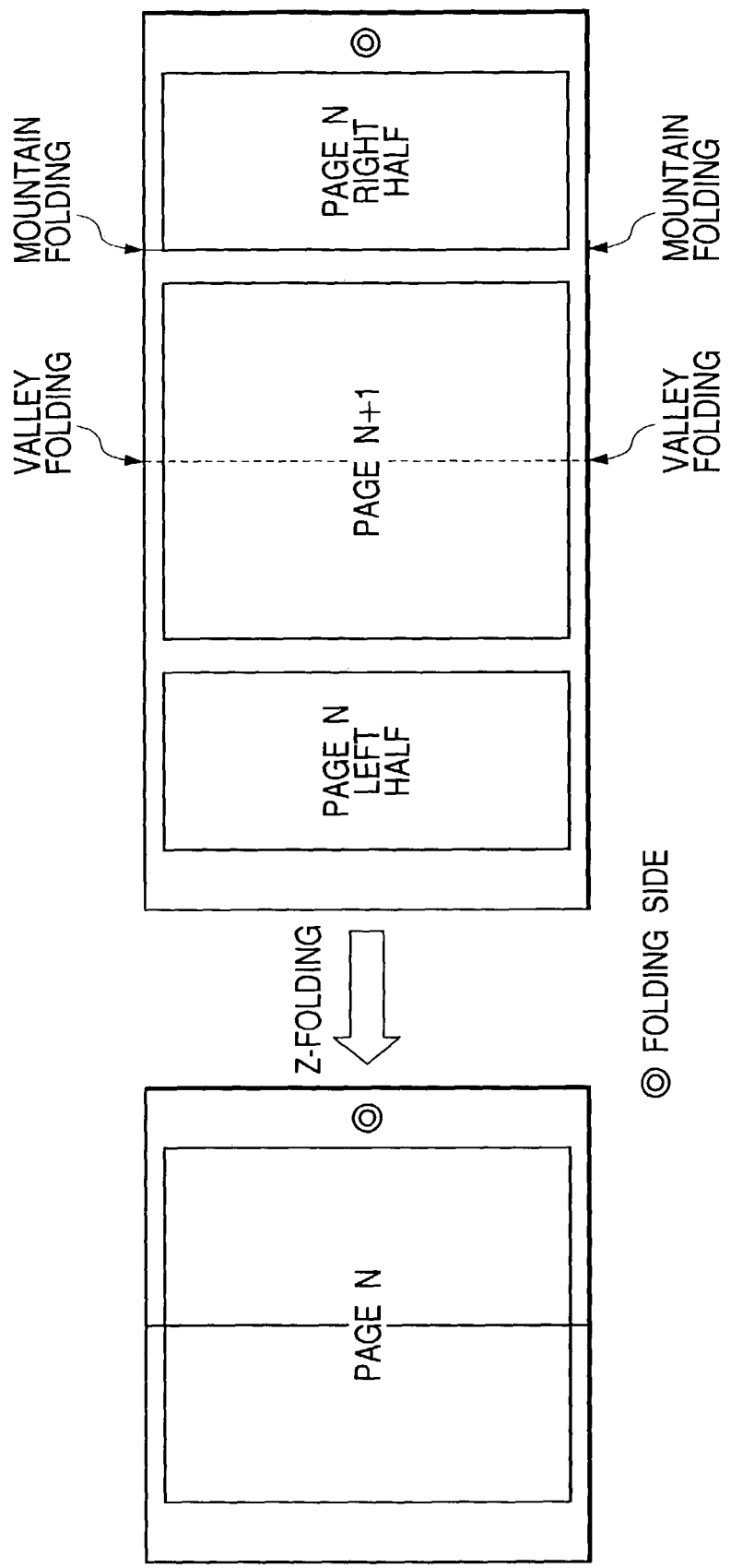
FIG. 6 is a diagram schematically showing an output example (when a 2-in-1 page layout is designated) of the Z-folding of the sheet processed by a Z-folding sheet page layout adjusting process in step S402 in FIG. 4.
Figure 7:
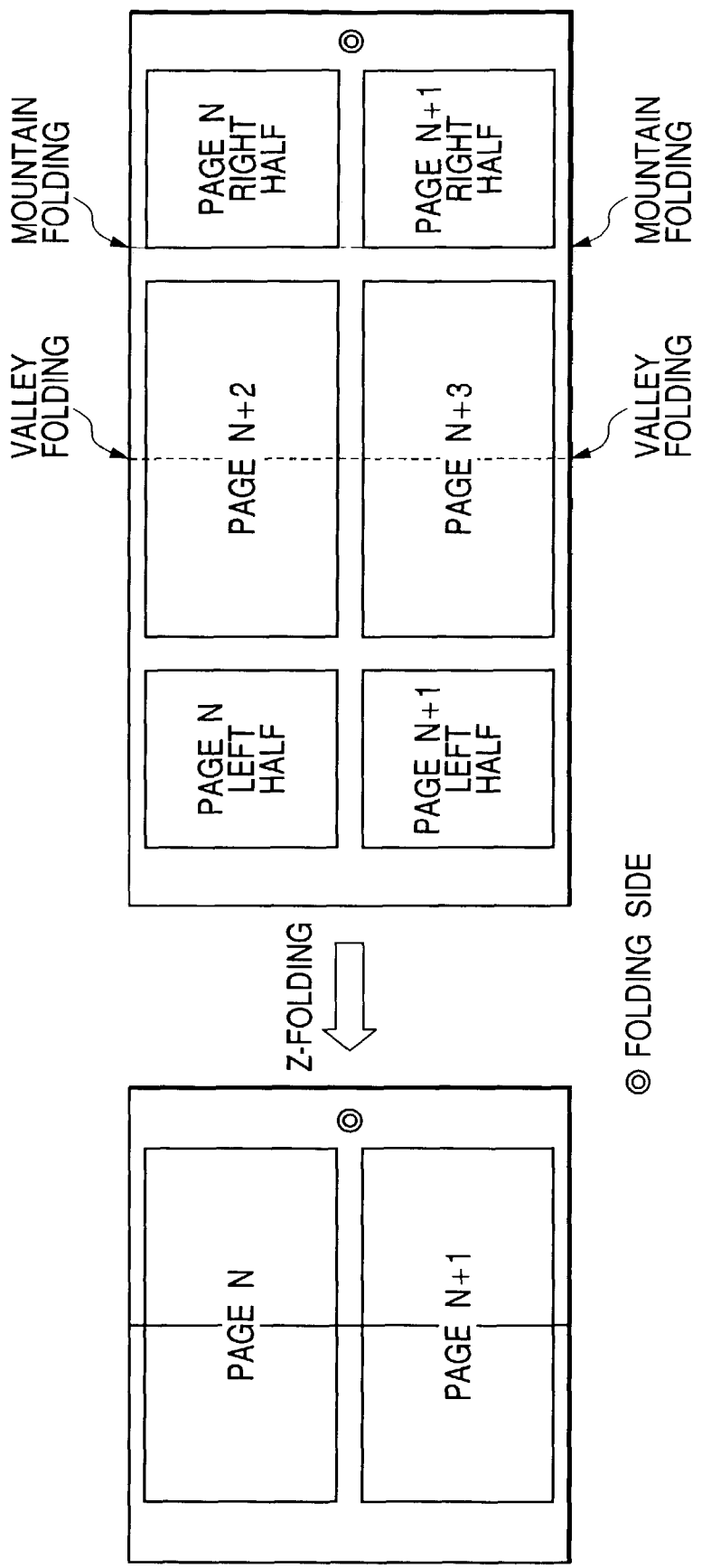
FIG. 7 is a diagram schematically showing an output example (when a 4-in-1 page layout is designated) of the Z-folding of the sheet processed by the Z-folding sheet page layout adjusting process in step S402 in FIG. 4.
Figure 8:
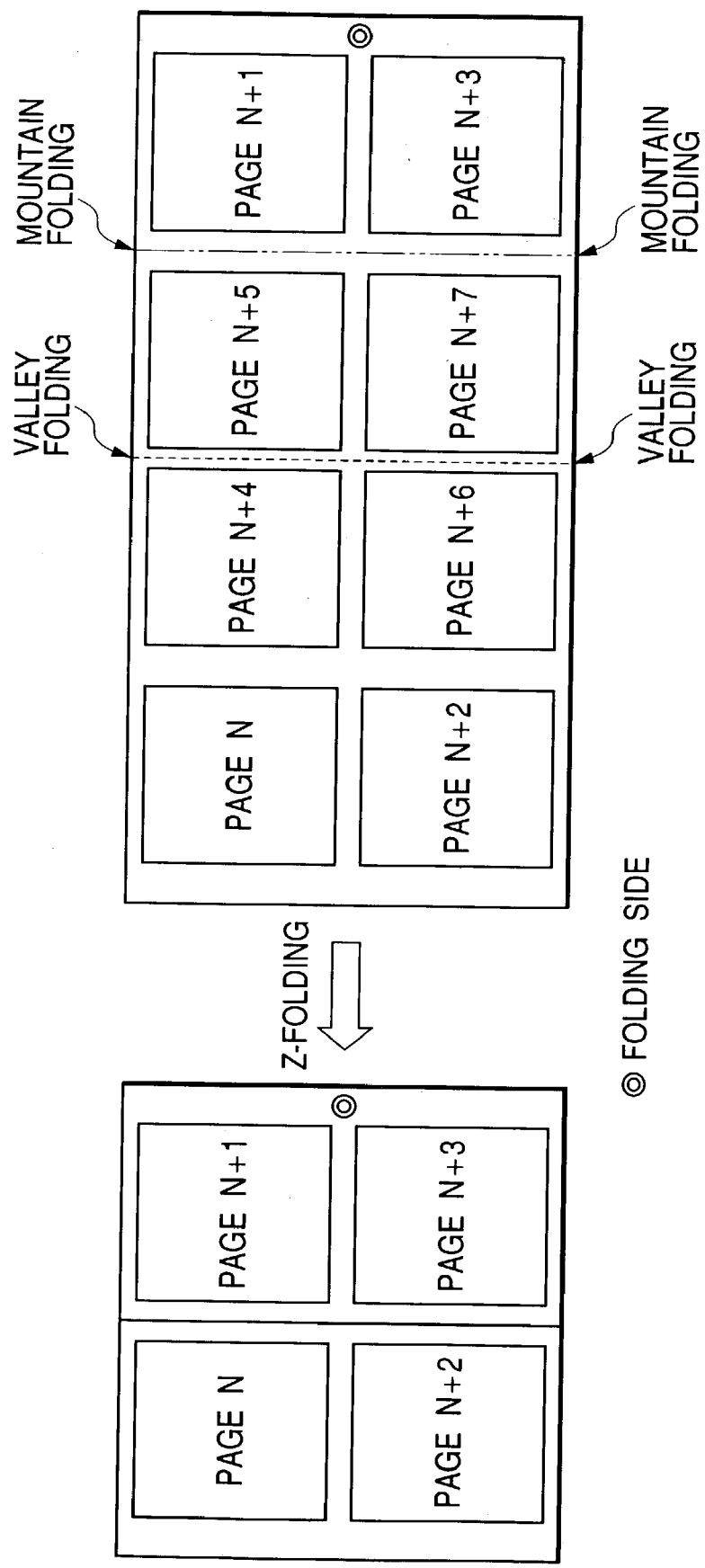
FIG. 8 is a diagram schematically showing an output example (when an 8-in-1 page layout is designated) of the Z-folding of the sheet processed by the Z-folding sheet page layout adjusting process in step S402 in FIG. 4.

Subsequently, the Z-folding sheet page layout adjusting process (Z-folding N-up output adjusting process) in step S402 will be described with reference to FIGS. 5, 6, 7, and 8. FIG. 5 is a diagram schematically showing an output example in the case where the sheet is Z-folded by the conventional page layout adjusting process. FIG. 6 is a diagram schematically showing an output example (when a 2-in-1 page layout is designated) of the Z-folding of the sheet processed by the Z-folding sheet page layout adjusting process in step S402 in FIG. 4. FIG. 7 is a diagram schematically showing an output example (when a 4-in-1 page layout is designated) of the Z-folding of the sheet processed by the Z-folding sheet page layout adjusting process in step S402 in FIG. 4. FIG. 8 is a diagram schematically showing an output example (when an 8-in-1 page layout is designated) of the Z-folding of the sheet processed by the Z-folding sheet page layout adjusting process in step S402 in FIG. 4.

Hitherto, even in the case of using the Z-folding function, the layout adjustment of a plurality of logic pages which are allocated to each physical page has been made without considering that after the sheet is print-outputted, it is Z-folded. For example, if the printing is performed in the landscape mode, the right side of the sheet is folded, and 2-in-1 in which two logic pages are allocated to one physical page is designated, as shown in FIG. 5, two logic pages of the page (n) and the page (n+1) are allocated to one physical page and the logic pages are arranged to the left and right with respect to the center portion on the physical page. It is now assumed that the output sheet is valley-folded in its center portion by the Z-folding process and, further, mountain-folded in the center position of the right half of the output sheet. In the embodiment, the side which is Z-folded with respect to the center of the sheet is referred to as a folding side. Although the folding side is shown by ⊙ on the diagram, this mark is not actually printed.

If the sheet on which the logic pages have been allocated as mentioned above is Z-folded, a part (the right half of the page (n)) of the information of the logic page (n) and a part (the left half of the page (n+1)) of the information of the logic page (n+1) are hidden. Therefore, in the Z-folding state, the information of both of the logic pages cannot be completely confirmed. To confirm the information of those pages, it is necessary to open the pages in the Z-folding state.

On the other hand, according to the embodiment, the Z-folding sheet page layout adjusting process (Z-folding N-up output adjusting process) is executed in order to expose the information of one logic page (print area) onto the surface in the Z-folding state and enable the information to be easily confirmed by the eyes. In this process, the layout adjustment of the logic pages is made in a manner such that even when a plurality of logic pages are allocated to the physical page (Z-folding sheet), at least one of the logic pages is exposed to the surface in the Z-folding state of the sheet even after the Z-folding.

For example, if the printing is performed in the landscape mode, the right side of the print sheet is folded, and the allocation of two logic pages to the physical page (2-in-1 page layout) is designated, as shown in FIG. 6, in one physical page, the page layout is adjusted in a manner such that the logic page (n+1) is allocated to the center area, the left half of the logic page (n) is printed to the area on the left side of the logic page (n+1), and the right half of the logic page (n) is printed to the area on the right side (area between the mountain-folding position and the right edge of the sheet) of the logic page (n+1), respectively, and the print data is formed.

If the data in which the layout of the logic pages has been made as mentioned above is outputted to the printer and the Z-folding is executed, the output sheet is valley-folded in the center portion of the logic page (n+1) and mountain-folded in a boundary portion between the logic page (n+1) and the right half of the logic page (n). Therefore, in the state where the sheet has been Z-folded, the left half of the logic page (n) and the right half of the logic page (n) are coupled and exposed as a single logic page.

As mentioned above, when the 2-in-1 page layout is designated, between the two logic pages which are allocated to the output sheet to be Z-folded, the head logic page (n) is divided and arranged to two left and right portions on the physical page, so that the left half and the right half of the head logic page (n) are coupled in a state where the sheet has been Z-folded and a single logic page is formed. At the time of the layout of the left half and the right half of the logic page, naturally, they are arranged so that the logic page (n+1) or the right half of the logic page (n) does not stride over the mountain-folding position.

When the printed sheet is Z-folded, the print area of the right half of the page (n) is controlled in consideration of the mountain-folding position of the Z-folding so that the logic page (n) is properly coupled (for example, a blank area is not caused between the left half and the right half). Specifically speaking, the position of the print area of the right half is adjusted so that the left edge portion of the print area of the right half of the page (n) is arranged at the position where a thickness of folding portion is added to the mountain-folding position.

The above control is made in the case where the printing is executed in the landscape mode and the right side of the sheet is folded (in other words, the left side of the sheet is set to the binding position), even in the case where either the right or left side of the sheet is folded, the page layout is as shown in FIG. 6. In the case of folding the left side of the sheet, it is sufficient that the position of the print area of the left half is adjusted so that the right edge portion of the print area of the left half of the page (n) is arranged at the position where a thickness of folding portion is added to the mountain-folding position (portion of the print area between the left half of the page (n) and the page (n+1)).

Also in the case where the direction of the printing to the sheet is set to the portrait mode, the lower portion is bent, and two logic pages are allocated to one physical page, the logic page (n) is divided into two so that the upper half and the lower half of the head logic page (n) are coupled and a single physical page is formed and the layout adjusting process is executed, so that the object of the invention is accomplished.

Subsequently, the (4-in-1 page layout) in which the direction of the printing to the sheet is set to the landscape mode, the right side is bent, and four logic pages (n, n+1, n+2, n+3) are allocated to the physical page will be described.

When the 4-in-1 page layout is designated, as shown in FIG. 7, in one physical page, the logic page (n+2) and the logic page (n+3) are arranged in its center area, the left halves of the logic pages (n) and (n+1) are arranged in the left side areas of the logic pages (n+2) and (n+3), and the right halves of the logic pages (n) and (n+1) are arranged in the right side areas (areas between the mountain-folding position and the right edge of the sheet) of the logic pages (n+2) and (n+3), respectively.

If the data in which such a layout of the logic page has been made is outputted to the printer and the Z-folding is executed, the output sheet is valley-folded in the center portions of the logic pages (n+2) and (n+3) and mountain-folded in the boundary portions between the logic pages (n+2) and (n+3) and the right halves of the logic pages (n) and (n+1), respectively. Therefore, in a state where the sheet has been Z-folded, the left halves of the logic pages (n) and (n+1) and the right halves of the logic pages (n) and (n+1) are coupled and each page is exposed as a single logic page.

As mentioned above, when the 4-in-1 page layout is designated, among the four logic pages which are allocated onto the physical page corresponding to the output sheet to be Z-folded, the head logic page (n) and the subsequent logic page (n+1) are divided and arranged in two left and right positions on the physical page. Thus, in a state where the sheet has been Z-folded, the left halves and the right halves of the logic pages (n) and (n+1) are coupled and a single logic page is formed. At the time of layout of the left halves and the right halves of the logic pages (n) and (n+1), naturally, they are arranged so that the logic pages (n+2) and (n+3) or the right halves of the logic pages (n) and (n+1) do not stride over the mountain-folding positions.

When the printed sheet is Z-folded, the print areas of the right halves of the page (n) and (n+1) are controlled in consideration of the mountain-folding positions of the Z-folding so that the logic pages (n) and (n+1) are properly coupled (for example, a blank area is not caused between the left halves and the right halves). Specifically speaking, the positions of the print areas of the right halves are adjusted so that the left edge portions of the print areas of the right halves of the pages (n) and (n+1) are arranged at the positions where a thickness of folding portion is added to the mountain-folding positions.

Although the above control is made in the case where the printing is executed in the landscape mode and the right side of the sheet is folded (in other words, the left side of the sheet is set to the binding position), even in the case where either the right or left side of the sheet is folded, the page layout is as shown in FIG. 6. In the case of folding the left side of the sheet, it is sufficient that the positions of the print areas of the left halves are adjusted so that the right edge portions of the print areas of the left halves of the pages (n) and (n+1) are arranged at the positions where the thickness of folding portion is added to the mountain-folding positions (portions between the left halves of the pages (n) and (n+1) and the pages (n+2) and (n+3)), respectively.

Also in the case where the direction of the printing to the sheet is set to the portrait mode, the lower portion is bent, and four logic pages are allocated to one physical page, each of the logic pages (n) and (n+1) is divided into two so that the upper halves and the lower halves of the head logic page (n) and the subsequent logic page (n+1) are coupled and a single logical page is formed and the layout adjusting process is executed, so that the object of the invention is accomplished.

Subsequently, the direction of the printing to the sheet is set to the landscape mode, the right side is bent, and the 8-in-1 page layout in which eight logic pages (n to n+7) are allocated to the physical page will be described. In the 8-in-1 page layout, even if the Z-folding N-up output adjusting process as mentioned in the 2-in-1 page layout or the 4-in-1 page layout is not executed, the logic pages can be arranged onto the physical page so that the information of the logic pages on the surface of the sheet is not hidden in a state where the sheet has been Z-folded.

However, in the general 8-in-1 page layout process, eight logic pages are arranged from the top left position to the top right position in order of the page (n) to the page (n+3) and arranged from the bottom left position to the bottom right position in order of the page (n+4) to the page (n+7). If the sheet subjected to such a layout process is Z-folded, the pages which are exposed to the surface of the sheet obtained after the Z-folding are the pages (n), (n+3), (n+4), and (n+7) in order of the top left position, the top right position, the bottom left position, and the bottom right position, so that this page order differs from the inherent page order.

In the embodiment, therefore, when the 8-in-1 page layout is designated, layout adjustment is made so that four logic pages which are exposed to the surface of the sheet in a state where the sheet has been Z-folded are arranged in page order.

Specifically speaking, when the 8-in-1 page layout is designated, as shown in FIG. 8, in one physical page, four logic pages (n+4, n+5, n+6, n+7) are arranged at the center, the logic pages (n, n+2) are arranged at the left edge, and the logic pages (n+1, n+3) are arranged at the right edge, respectively.

If the data in which such a layout of the logic pages has been made is outputted to the printer and the sheet is Z-folded, the output sheet is valley-folded in its center portion (at the boundaries of the logic pages (n+4) and (n+6) and the logic pages (n+5) and (n+7)) and mountain-folded in the center portion (at the boundary portions of the logic pages (n+5) and (n+7) and the logic pages (n+1) and (n+3)) in the right half of the sheet. Therefore, in a state where the sheet has been Z-folded, the logic pages (n, n+1, n+2, n+3) which are exposed to the surface of the sheet are arranged in page order. The residual logic pages (n+4, n+5, n+6, n+7) are arranged on the inner surface of the sheet (the positions where the pages are not exposed in the Z-folding state).

As mentioned above, when the 8-in-1 layout is designated, among the eight logic pages which are allocated onto the physical page corresponding to the output sheet which is Z-folded, two logic pages (n, n+2) are arranged to the left edge on the physical page, two logic pages (n+1, n+3) are arranged to the right edge on the physical page, and the residual logic pages (n+4, n+5, n+6, n+7) are arranged at the center on the physical page, respectively. Thus, even in a state where the sheet has been Z-folded, the four logic pages which are exposed to the surface of the sheet can be arranged in page order.

At the time of the layout of the logic pages (n+1), (n+3), (n+5), and (n+7), naturally, the layout positions are adjusted so that the two logic pages (n+1, n+3) or the two logic pages (n+5, n+7) do not stride over the mountain-folding positions. Such a process is applied to the case of folding the right side of the sheet. In the case of folding the left side of the sheet, the layout positions are adjusted so that the two logic pages (n, n+2) or the two logic pages (n+4, n+6) do not stride over the mountain-folding positions (portions between the pages (n) and (n+2) and the pages (n+4) and (n+6)).

Also, the direction of the printing to the sheet is set to the portrait mode, the lower portion is bent, and eight logic pages are allocated to the physical page, the pages are processed in a manner such that the logic pages are arranged in the exposed portions of the sheet in the Z-folding state in page order in a manner similar to the case of the landscape mode.

By the above construction, in the embodiment, when the Z-folding printing is executed, the layout adjustment in which the logic pages existing on the surface of the output sheet in the Z-folding state can be easily confirmed can be made. Also in the Z-folding state, the layout adjustment can be made so that the proper page order is obtained.

Consequently, the printing which can be easily read by the user and whose print image is also beautiful can be performed.

Other Embodiments of the Invention

Figure 9:
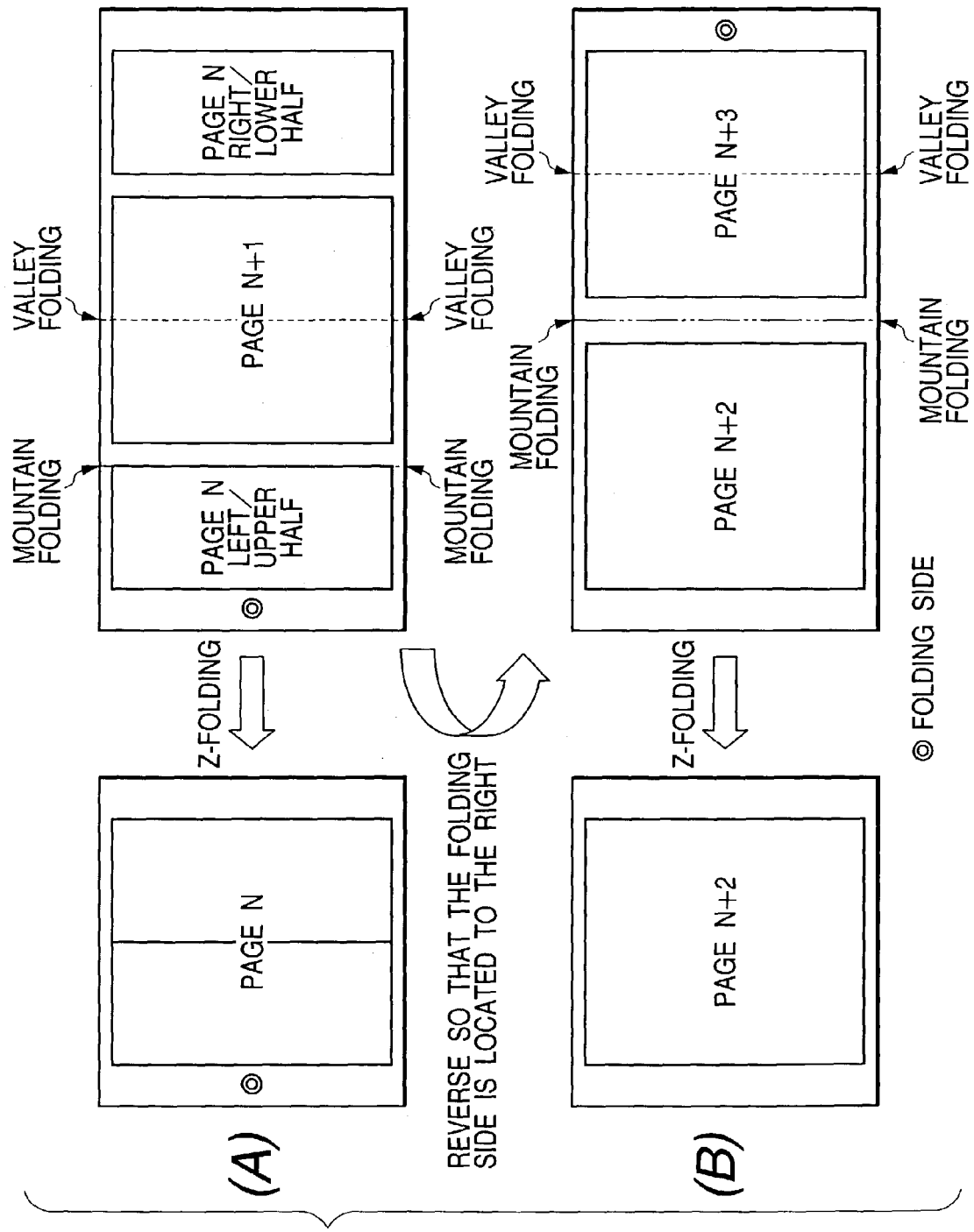
FIG. 9 is a diagram schematically showing an output example (when a 2-in-1 page layout is designated) of a Z-folding of a sheet processed by a Z-folding sheet page layout adjusting process according to another embodiment of the invention.
Figure 10:
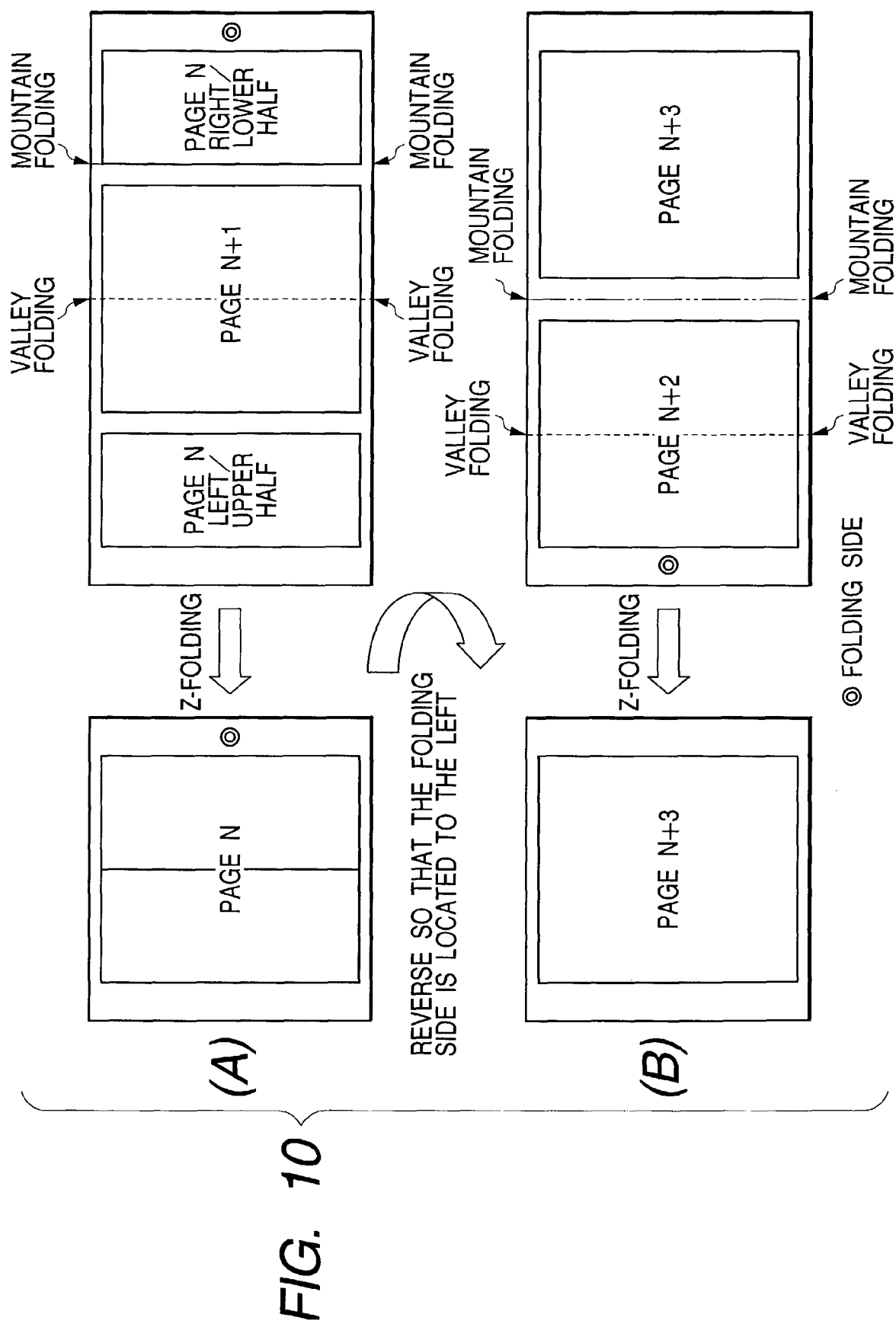
FIG. 10 is a diagram showing a conventional Z-folding output example in the case where a duplex printing mode and the 2-in-1 page layout are designated.

Other embodiments of the invention will now be described with reference to FIGS. 9, 10, 11, and 12. FIG. 9 is a schematic diagram for explaining a method of a Z-folding sheet page layout adjusting process according to another embodiment of the invention. FIG. 10 is a schematic diagram for explaining a case where the sheet outputted by the conventional page layout process has been Z-folded. FIG. 11 is a diagram schematically showing an output example (when the 4-in-1 page layout is designated) of the Z-folding of a sheet processed by the Z-folding sheet page layout adjusting process according to another embodiment of the invention. FIG. 12 is a diagram schematically showing an output example (when the 8-in-1 page layout is designated) of the Z-folding of a sheet processed by the Z-folding sheet page layout adjusting process according to another embodiment of the invention.

Since a construction of the host computer 3000 and the printer 1500 in the embodiment is similar to that in the foregoing embodiment, its description is omitted here.

In the embodiment, the Z-folding N-up output adjusting process which is applied to the case where duplex printing is executed by using a printer which can perform the duplex printing and a duplex-printed output sheet is Z-folded will be described.

In the duplex printing mode, for example, it is assumed that the direction of the printing to the sheet is set to the landscape mode, the right side is bent, and the 2-in-1 page layout in which two logic pages are allocated to the physical page is designated. In this case, two logic pages are arranged onto the front surface of the sheet (the obverse side in the duplex printing mode) and the back surface (the reverse side) of the sheet, respectively. The layout of the logic pages which are arranged onto the front surface of the sheet is made in a manner similar to the case of the 2-in-1 page layout (in the simplex printing mode) shown in FIG. 6.

In the layout of the logic pages which are arranged onto the back surface of the sheet, unlike the layout process of the front surface, a process for allocating the logic pages to each of the right and left print areas of the sheet without dividing them is executed. This is because since one logic page is displayed to the print area on the right side of the back surface (that is, the area locating on the back surface of the print area on the left side of the front surface), another one logic page is allocated to the print area on the left side of the back surface, and the sheet is folded in this state, a part of the logic pages is not hidden.

However, if the general logic page layout process is executed to the back surface in the duplex printing mode, there is a case where the page order of the logic pages which are exposed to the back surface of the sheet in the Z-folding state is broken in dependence on which one of the right/left edges and the upper/lower edges of the sheet is bent (which side is set to the binding position).

For example, a case where four logic pages (n) to (n+3) are printed in the duplex printing mode, the 2-in-1 page layout is designated, and the sheet is printed in the landscape mode will now be considered. In this state, a case where a mode of folding the left side for the front surface of the sheet has been set and a case where a mode of folding the right side has been set are shown in FIGS. 9 and 10, respectively.

FIG. 9 shows how the logic pages are arranged on the front surface of the sheet in the case where the mode to fold the left side of the sheet has been set (A). This figure also shows a state of the back surface of the sheet in the case where the mode to fold the left side of the sheet has been set (B). It is now assumed that the page layout process according to the embodiment mentioned above is executed to the front surface of the sheet and the layout process which is generally executed in the conventional technique is performed to the back surface of the sheet.

As shown in FIG. 9, a layout of the front surface is made in accordance with the layout process in the foregoing embodiment. On the front surface, the pages are allocated so that the page (n) is exposed in the Z-folding state. On the back surface, the pages are allocated so that the page (n+2) arranged on the left side of the sheet is exposed. Since the page (n+3) has been printed to the Z-folded portion, if the Z-folded portion is extended, the page (n+3) appears. Therefore, in this case, it will be understood that it is sufficient to execute the layout process of the front surface of the sheet in a manner similar to the foregoing embodiment and execute the layout process of the back surface of the sheet in a manner similar to the conventional general layout process.

FIG. 10 shows how the logic pages are arranged onto the front surface of the sheet in the case where the mode to fold the right side of the sheet has been set (A). This figure also shows a state of the back surface of the sheet in the case where the mode to fold the right side of the sheet has been set. To show the page layout process which is peculiar to the embodiment, it is assumed that the page layout process according to the foregoing embodiment is executed to the front surface of the sheet and the layout process which is generally executed in the conventional technique is performed to the back surface of the sheet.

As shown in FIG. 10, a layout of the front surface is made in accordance with the layout process in the foregoing embodiment. On the front surface, the pages are allocated so that the page (n) is exposed in the Z-folding state. On the back surface, the pages are allocated so that the page (n+3) arranged on the right side of the sheet is exposed. The page (n+2) has been printed to the Z-folded portion. Therefore, in this case, if the duplex printing mode of 2-in-1 is designated and the sheet is Z-folded on the basis of the conventional technique, the page (n+3) is exposed and the page (n+2) to be inherently exposed is hidden.

Such a situation is not limited to the landscape mode but even in the portrait mode, the page order upon Z-folding is shifted in dependence on which side of the upper and lower edge portions of the sheet is bent.

To prevent it, therefore, in the embodiment, if the duplex printing mode is set and the N-up page layout is designated, the layout adjustment is made so that the logic pages allocated to the front and back surfaces are arranged in page order in the Z-folding state of the sheet in accordance with the folding side of the sheet.

Specifically speaking, if the duplex printing mode and the N-up page layout are designated, among the logic pages which are printed to the back surface of the output sheet, the page whose page order is small is arranged on the opposite side of the side which is Z-folded with respect to the center line of the sheet.

For example, when the duplex printing mode and the 2-in-1 page layout are designated, assuming that the left side is bent toward the back surface (that is, the case corresponding to FIG. 10, (B)), the layout is adjusted so as to arrange the logic page (n+3) to the left side (the side to be bent). Assuming that the right side is bent toward the back surface (that is, the case corresponding to FIG. 9, (B)), the layout is adjusted so as to become a layout as shown in FIG. 12. Thus, in the Z-folding state, among the logic pages allocated to the front and back surfaces of the output sheet, the head page in the page order can be exposed.

This is also true of the case where the sheet in which the duplex printing mode and the 4-in-1 page layout have been designated and which has been outputted is Z-folded or the case where the sheet in which the 8-in-1 page layout has been designated and which has been outputted is Z-folded. Output results of the back surface of the sheets in such cases are shown in FIGS. 11 and 12. The page layouts shown in FIGS. 11 and 12 are examples. In the case of the 4-in-1 page layout, the positional relation between the logic pages (n+4) and (n+5) can be also reversed. Also in the 8-in-1 page layout, the positional relations among the logic pages (n+8) to (n+11) are not limited to those shown in the diagram. Upon adjustment of the positional relations among the logic pages, it is sufficient to construct in a manner such that the user can arbitrarily adjust them by a printer driver.

In any of the page layouts, consideration is made to the print area of each logic page so that the logic pages existing on both sides of the mountain-folding position do not stride over the mountain-folding position.

As described above in the embodiment, in the case of Z-folding the duplex-printed sheet by using the N-up function, the layout can be adjusted so that the page whose page order is small is exposed in the Z-folding state. Therefore, the printing which can be easily read by the user and whose print image is also beautiful can be performed.

The invention can be applied to a system constructed by a plurality of apparatuses (for example, a host computer, an interface device, a reader, a printer, and the like) or an apparatus comprising one equipment (for example, a copying apparatus, a facsimile apparatus, or the like). In this case, the copying apparatus or the facsimile apparatus corresponds to the print control apparatus of the invention.

Naturally, the object of the invention is accomplished by a method whereby a memory medium (or a recording medium) in which program codes of software to realize the functions of the embodiments mentioned above have been recorded is supplied to a system or an apparatus and a computer (or a CPU or an MPU) of the system or the apparatus reads out and executes the program codes stored in the memory medium. In this case, the program codes themselves read out from the memory medium realize the functions of the embodiments mentioned above and the memory medium in which the program codes have been stored constructs the invention. Naturally, the invention incorporates not only a case where a computer executes the read-out program codes, so that the functions of the embodiments mentioned above are realized but also a case where an operating system (OS) or the like which is operating on the computer executes a part or all of actual processes on the basis of instructions of the program codes and the functions of the embodiments mentioned above are realized by those processes.

Further, naturally, the invention also incorporates a case where the program codes read out from the memory medium are written into a memory provided for a function expanding card inserted into a computer or a function expanding unit connected to a computer and, thereafter, a CPU or the like provided for the function expanding card or the function expanding unit executes a part or all of actual processes on the basis of instructions of the program codes and the functions of the embodiments mentioned above are realized by those processes.

As described above, according to the invention, upon execution of the printing using the Z-folding function of the printing apparatus, since the page layout of a plurality of logic pages allocated to the print surface of the output sheet which is Z-folded by the Z-folding function is adjusted so that the print area of at least one logic page is exposed, when the Z-folding printing is executed, the logic pages existing on the surface of the output sheet in the Z-folding state can be recognized. Printed matter whose beauty is not lost can be formed.

What is claimed is:

1. A print control apparatus for forming print data to be printed by a printing apparatus having a Z-folding function, the apparatus comprising:
    a layout designating unit constructed to designate a print mode in which a plurality of logic pages are printed on one of print surfaces of a sheet to be output by the printing apparatus, the plurality of logic pages including first and second logic pages;
    Z-folding designation unit constructed to designate printing using the Z-folding function; and
    a generating unit constructed to generate print data, in accordance with the designation of the print mode by said layout designating unit and the designation of the printing using the Z-folding function by said Z-folding designation unit, pages so that the first logic page is divided into two pieces and the second logic page is placed between the two pieces on the one print surface of the sheet,
    wherein, when the sheet is output based on the print data generated by said generating unit and is Z-folded, the two pieces are coupled so that the first logic page is exposed as a whole and the second logic page is completely hidden.

2. An apparatus according to claim 1, wherein, if a print mode in which two logic pages are printed on the one print surface is designated by said layout designating unit and if the printing using the Z-folding function is designated by said Z-folding designation unit, said generating unit divides the first logic page into right and left pieces or upper and lower pieces and adjusts the layout so that the right and left pieces or upper and lower pieces are located at right and left edges, respectively, or at upper and lower edges, respectively, on the print surface.

3. An apparatus according to claim 1, wherein the plurality of logic pages include the first and second logic pages in pairs.

4. A print control method of forming print data to be printed by a printing apparatus having a Z-folding function, comprising:
    designating a print mode in which a plurality of logic pages are printed on one of print surfaces of a sheet to be output by the printing apparatus, the plurality of logic pages including first and second logic pages;
    designating printing using the Z-folding function; and
    generating print data, in accordance with the designation of the print mode in said layout designating and the designation of the printing using the Z-folding function in said Z-folding designating, so that the first logic page is divided into two pieces and the second logic page is placed between the two pieces on the one print surface of the sheet,
    wherein, when the sheet is output based on the generated print data and is Z-folded, the two pieces are coupled so that the first logic page is exposed as a whole and the second logic page is completely hidden.

5. A method according to claim 4, wherein, in said generating, if a print mode in which two logic pages are printed on the one print surface is designated in said layout designating and if the printing using the Z-folding function is designated in said Z-folding designating, the first logic page is divided into right and left pieces or upper and lower pieces and the layout is adjusted so that the right and left pieces or upper and lower pieces are located at right and left edges, respectively, or at upper and lower edges, respectively, on the print surface.

6. A print control program stored on a computer-readable memory medium for allowing a computer to execute a print control method according to claim 4.

7. A computer-readable memory medium in which a print control program according to claim 6 has been stored so that it can be read out by the computer.

8. A method according to claim 4, wherein the plurality of logic pages include the first and second logic pages in pairs.

* * * * *